United States Patent
Pape et al.

(10) Patent No.: US 11,615,033 B2
(45) Date of Patent: Mar. 28, 2023

(54) REDUCING TRANSLATION LOOKASIDE BUFFER SEARCHES FOR SPLINTERED PAGES

(71) Applicant: Apple Inc., Cupertino, CA (US)

(72) Inventors: John D. Pape, Cedar Park, TX (US); Brian R. Mestan, Austin, TX (US); Peter G. Soderquist, Milford, MA (US)

(73) Assignee: Apple Inc., Cupertino, CA (US)

( * ) Notice: Subject to any disclaimer, the term of this patent is extended or adjusted under 35 U.S.C. 154(b) by 207 days.

(21) Appl. No.: 17/016,229

(22) Filed: Sep. 9, 2020

(65) Prior Publication Data

US 2022/0075734 A1    Mar. 10, 2022

(51) Int. Cl.
*G06F 12/1027*    (2016.01)
*G06F 9/455*    (2018.01)

(52) U.S. Cl.
CPC ...... *G06F 12/1027* (2013.01); *G06F 9/45558* (2013.01); *G06F 2009/45583* (2013.01); *G06F 2212/683* (2013.01)

(58) Field of Classification Search
CPC ....... G06F 9/45558; G06F 2009/45583; G06F 12/1027; G06F 12/12; G06F 2212/683
USPC ...................................................... 711/207
See application file for complete search history.

(56) References Cited

U.S. PATENT DOCUMENTS

| | | |
|---|---|---|
| 5,491,806 A | 2/1996 | Horstmann et al. |
| 5,905,998 A | 5/1999 | Ebrahim et al. |
| 5,946,717 A | 8/1999 | Uchibori |
| 6,026,461 A | 2/2000 | Baxter et al. |
| 6,516,379 B1 | 2/2003 | Deshpande et al. |
| 6,523,076 B1 | 2/2003 | Kruse |
| 6,542,949 B1 | 4/2003 | Kruse |
| 6,560,689 B1 | 5/2003 | Mathews et al. |
| 7,079,485 B1 | 7/2006 | Lau et al. |

(Continued)

OTHER PUBLICATIONS

Shreedhar et al., "Efficient Fair Queueing Using Deficit Round Robin", IEEE/ACM Transactions on Networking, Jun. 1996, pp. 375-385, vol. 4, No. 3, IEEE Press.

(Continued)

*Primary Examiner* — Reginald G Bragdon
*Assistant Examiner* — Aaron D Ho
(74) *Attorney, Agent, or Firm* — Kowert Hood Munyon Rankin and Goetzel PC; Rory D. Rankin

(57) ABSTRACT

Systems, apparatuses, and methods for performing efficient translation lookaside buffer (TLB) invalidation operations for splintered pages are described. When a TLB receives an invalidation request for a specified translation context, and the invalidation request maps to an entry with a relatively large page size, the TLB does not know if there are multiple translation entries stored in the TLB for smaller splintered pages of the relatively large page. The TLB tracks whether or not splintered pages for each translation context have been installed. If a TLB invalidate (TLBI) request is received, and splintered pages have not been installed, no searches are needed for splintered pages. To refresh the sticky bits, whenever a full TLB search is performed, the TLB rescans for splintered pages for other translation contexts. If no splintered pages are found, the sticky bit can be cleared and the number of full TLBI searches is reduced.

20 Claims, 12 Drawing Sheets

(56) References Cited

U.S. PATENT DOCUMENTS

| | | |
|---|---|---|
| 7,149,829 B2 | 12/2006 | Weber et al. |
| 7,430,650 B1 | 9/2008 | Ross |
| 7,461,190 B2 | 12/2008 | Subramanian et al. |
| 8,037,250 B1 | 10/2011 | Barreh et al. |
| 8,108,650 B2 | 1/2012 | Petolino, Jr. |
| 8,316,212 B2 | 11/2012 | Petolino, Jr. |
| 8,682,864 B1 | 3/2014 | Plevyak et al. |
| 9,852,084 B1 | 12/2017 | Soderquist et al. |
| 10,140,216 B2 | 11/2018 | Williams et al. |
| 10,552,339 B2 | 2/2020 | Basu et al. |
| 10,649,907 B2 | 5/2020 | Abhishek Raja |
| 10,671,762 B2 | 6/2020 | Gulati et al. |
| 10,725,928 B1 * | 7/2020 | Mestan ............... G06F 12/1045 |
| 2001/0010066 A1 | 7/2001 | Chin et al. |
| 2005/0268045 A1 | 12/2005 | Slegel et al. |
| 2007/0005932 A1 | 1/2007 | Covelli et al. |
| 2010/0318762 A1 | 12/2010 | Malyugin et al. |
| 2012/0215979 A1 * | 8/2012 | Hunt ................... G06F 12/0802 |
| | | 711/E12.017 |
| 2014/0173216 A1 | 6/2014 | Jayasena et al. |
| 2014/0325167 A1 | 10/2014 | Slegel et al. |
| 2015/0100753 A1 | 4/2015 | Shen et al. |
| 2015/0121046 A1 * | 4/2015 | Kunjan ............... G06F 12/1027 |
| | | 712/225 |
| 2016/0140042 A1 | 5/2016 | Mukherjee |
| 2016/0283384 A1 | 9/2016 | Podaima et al. |
| 2016/0350225 A1 | 12/2016 | Podaima et al. |
| 2017/0286300 A1 | 10/2017 | Doshi et al. |
| 2018/0018280 A1 | 1/2018 | Bradbury et al. |
| 2019/0155747 A1 | 5/2019 | Sandberg et al. |
| 2020/0218665 A1 * | 7/2020 | Swaine ............... G06F 12/0882 |
| 2021/0334222 A1 * | 10/2021 | Wood ................... G06F 9/45558 |

OTHER PUBLICATIONS

Chidambaram Nachiappan, et al., U.S. Appl. No. 16/786,581, entitled "Configurable Packet Arbitration With Minimum Progress Guarantees", filed Feb. 10, 2020, 38 pages.

Non-Final Office Action in U.S. Appl. No. 16/786,581, dated Jul. 24, 2020, 13 pages.

* cited by examiner

900

905
Detect a Condition for Performing an Index Walk through all Indices of a TLB for a First Translation Context

910
Retrieve the Splintered Sticky Bits for One or More Other Translation Contexts For Each of these Other Translation Contexts

915
Is the Splintered Sticky Bit Set?

Yes ↓   No →

920
Does the Translation Context Meet One or More Conditions?

Yes ↓   No →

925
Perform a Rescan Procedure for the Other Translation Context while Performing the Index Walk for the First Translation Context

930
Do Not Perform a Rescan Procedure for the Other Translation Context

FIG. 9

REDUCING TRANSLATION LOOKASIDE BUFFER SEARCHES FOR SPLINTERED PAGES

BACKGROUND

Technical Field

Embodiments described herein relate to the field of computing systems and, more particularly, to using a rescan to refresh the sticky bits to enable an efficient Translation Lookaside Buffer splinter flow.

Description of the Related Art

Generally speaking, a variety of computing systems include one or more processors and any number of memory devices, and the processor(s) generate access requests for instructions and application data while processing software applications. Examples of processors include a central processing unit (CPU), data parallel processors like graphics processing units (GPUs), digital signal processors (DSPs), multimedia engines, and so forth. Each of the processors utilize virtual addresses when processing the accessed data and instructions. A virtual address space for the data and instructions stored in system memory and used by a software process is divided into pages of a given size. The virtual pages are mapped to pages of physical memory. Mappings of virtual addresses to physical addresses keep track of where virtual pages are stored in the physical memory. These mappings are stored in a page table and this page table is stored in memory. A translation look-aside buffer (TLB), which is also a cache, stores a subset of the page table. The TLB resides between a processor and a given level of the cache hierarchy. Alternatively, a TLB resides between two levels of the system memory hierarchy. In use, the TLB is accessed with a virtual address of a given memory access request to determine whether the TLB contains an associated physical address for a memory location holding requested data.

In a system that provides virtual machine support, the system page size as viewed from the virtual machine being emulated (referred to as guest) may be different from the size used in the TLBs of the physical machine (referred to as host). Page splintering occurs in such systems when the guest manages an initial stage of translation using a large page size, but the host manages subsequent and/or final stages using a smaller page size. When this occurs, the large guest pages are splintered into smaller page sizes and stored in the TLB. Because the guest has the illusion that it is controlling the physical hardware, it manages its page tables using its own view of the page size when performing TLB maintenance operations. When the larger page is to be invalidated using a TLB invalidate (TLBI) operation issued by the guest, for example, all of the splintered pages in the TLB need to be invalidated. Generally, this means the entire TLB needs to be searched for splintered pages, which is slow. In can be appreciated that the page splintering problem can occur not only in systems with virtual machine support, but in any system that has multiple independently controlled stages of address translation between the virtual address and the final physical address.

In view of the above, efficient methods and mechanisms for improving the efficiency of TLB invalidation operations for splintered pages are desired.

SUMMARY

Systems, apparatuses, and methods for performing efficient TLB invalidation operations for splintered pages are contemplated. In one embodiment, the TLB tracks whether or not guest operating system (OS) pages for a given translation context have been installed and whether or not splintered pages for the translation context have been installed. If a TLB invalidate (TLBI) request that only affects guest pages is received, and if guest pages have not been installed, as indicated by a corresponding first sticky bit, no searches are needed for guest pages. As used herein, a "sticky bit" is defined as a binary state element which is automatically set to a given value based on specific conditions, with the binary state element retaining this given value until cleared by an explicit command or operation.

If guest pages have been installed, a second sticky bit indicates whether or not splintered pages have been encountered for the guest. If the second sticky bit is set, then the whole TLB is searched for splintered pages. In one embodiment, the sticky bits get set and stay set until the next processor core reset. To refresh the sticky bits, whenever a full TLB search is performed, the TLB rescans for guest pages of any type. If no guest pages are found, then the first sticky bit is cleared and the number of TLBI scans is reduced. Also, whenever a full TLB search is performed, the TLB rescans for splintered pages of any type with a guest page size greater than a physical page size. If no splintered pages are found for a given guest, then the guest's second sticky bit can be cleared and the number of full TLBI scans is reduced.

These and other embodiments will be further appreciated upon reference to the following description and drawings.

BRIEF DESCRIPTION OF THE DRAWINGS

The above and further advantages of the methods and mechanisms may be better understood by referring to the following description in conjunction with the accompanying drawings, in which:

FIG. 9 is a flow diagram of one embodiment of a method for checking the rescan conditions for translation contexts.

Figure 1:
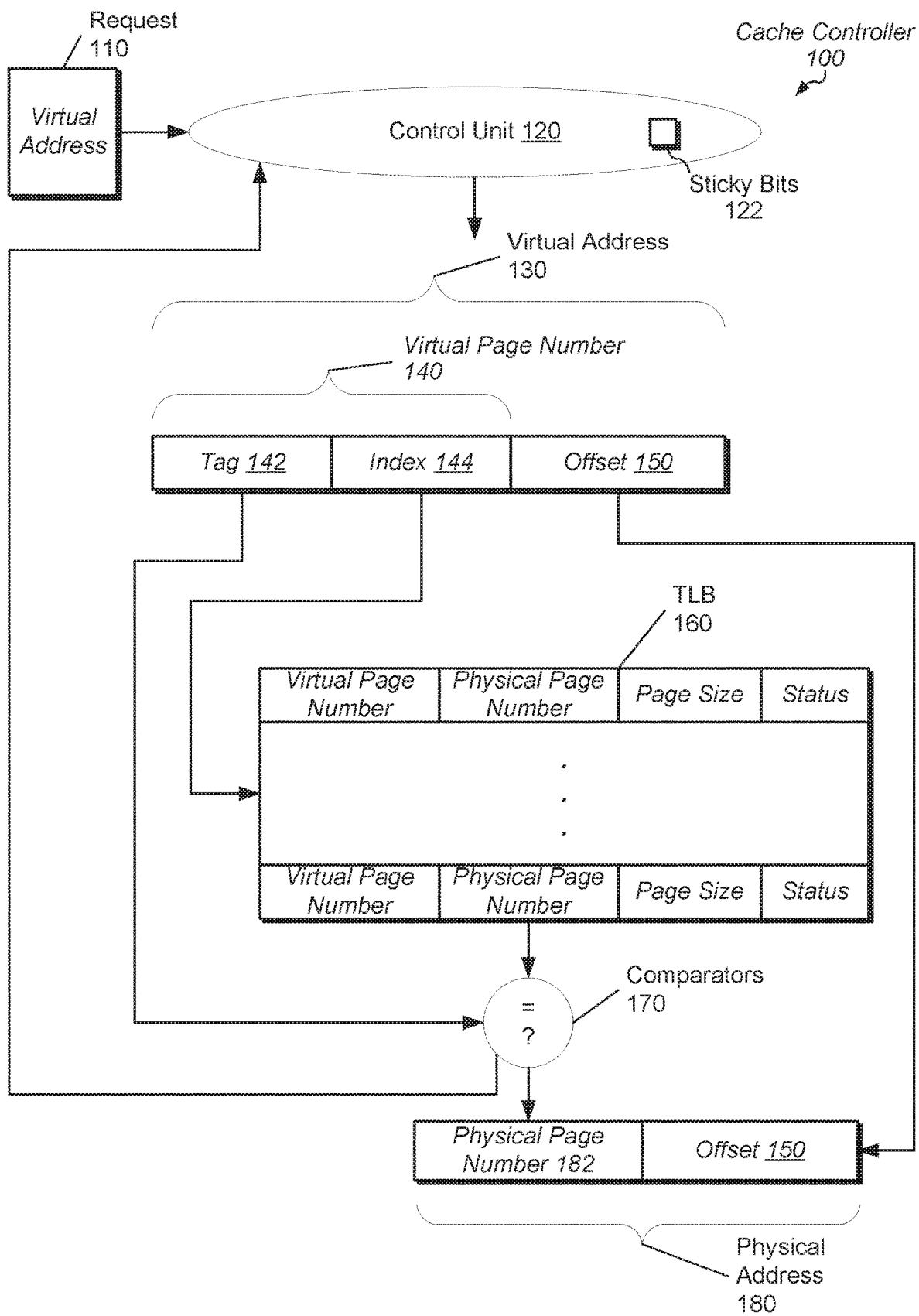
FIG. 1 is a generalized block diagram of one embodiment of a cache controller.

While the embodiments described in this disclosure may be susceptible to various modifications and alternative forms, specific embodiments thereof are shown by way of example in the drawings and will herein be described in detail. It should be understood, however, that the drawings and detailed description thereto are not intended to limit the embodiments to the particular form disclosed, but on the contrary, the intention is to cover all modifications, equivalents and alternatives falling within the spirit and scope of the appended claims.

The present disclosure includes references to "an "embodiment" or groups of "embodiments" (e.g., "some embodiments" or "various embodiments"). Embodiments are different implementations or instances of the disclosed concepts. References to "an embodiment," "one embodiment," "a particular embodiment," and the like do not necessarily refer to the same embodiment. A large number of possible embodiments are contemplated, including those specifically disclosed, as well as modifications or alternatives that fall within the spirit or scope of the disclosure.

This disclosure may discuss potential advantages that may arise from the disclosed embodiments. Not all implementations of these embodiments will necessarily manifest any or all of the potential advantages. Whether an advantage is realized for a particular implementation depends on many factors, some of which are outside the scope of this disclosure. In fact, there are a number of reasons why an implementation that falls within the scope of the claims might not exhibit some or all of any disclosed advantages. For example, a particular implementation might include other circuitry outside the scope of the disclosure that, in conjunction with one of the disclosed embodiments, negates or diminishes one or more the disclosed advantages. Furthermore, suboptimal design execution of a particular implementation (e.g., implementation techniques or tools) could also negate or diminish disclosed advantages. Even assuming a skilled implementation, realization of advantages may still depend upon other factors such as the environmental circumstances in which the implementation is deployed. For example, inputs supplied to a particular implementation may prevent one or more problems addressed in this disclosure from arising on a particular occasion, with the result that the benefit of its solution may not be realized. Given the existence of possible factors external to this disclosure, it is expressly intended that any potential advantages described herein are not to be construed as claim limitations that must be met to demonstrate infringement. Rather, identification of such potential advantages is intended to illustrate the type(s) of improvement available to designers having the benefit of this disclosure. That such advantages are described permissively (e.g., stating that a particular advantage "may arise") is not intended to convey doubt about whether such advantages can in fact be realized, but rather to recognize the technical reality that realization of such advantages often depends on additional factors.

Unless stated otherwise, embodiments are non-limiting. That is, the disclosed embodiments are not intended to limit the scope of claims that are drafted based on this disclosure, even where only a single example is described with respect to a particular feature. The disclosed embodiments are intended to be illustrative rather than restrictive, absent any statements in the disclosure to the contrary. The application is thus intended to permit claims covering disclosed embodiments, as well as such alternatives, modifications, and equivalents that would be apparent to a person skilled in the art having the benefit of this disclosure.

For example, features in this application may be combined in any suitable manner. Accordingly, new claims may be formulated during prosecution of this application (or an application claiming priority thereto) to any such combination of features. In particular, with reference to the appended claims, features from dependent claims may be combined with those of other dependent claims where appropriate, including claims that depend from other independent claims. Similarly, features from respective independent claims may be combined where appropriate.

Accordingly, while the appended dependent claims may be drafted such that each depends on a single other claim, additional dependencies are also contemplated. Any combinations of features in the dependent that are consistent with this disclosure are contemplated and may be claimed in this or another application. In short, combinations are not limited to those specifically enumerated in the appended claims.

Where appropriate, it is also contemplated that claims drafted in one format or statutory type (e.g., apparatus) are intended to support corresponding claims of another format or statutory type (e.g., method).

Because this disclosure is a legal document, various terms and phrases may be subject to administrative and judicial interpretation. Public notice is hereby given that the following paragraphs, as well as definitions provided throughout the disclosure, are to be used in determining how to interpret claims that are drafted based on this disclosure.

References to a singular form of an item (i.e., a noun or noun phrase preceded by "a," "an," or "the") are, unless context clearly dictates otherwise, intended to mean "one or more." Reference to "an item" in a claim thus does not, without accompanying context, preclude additional instances of the item. A "plurality" of items refers to a set of two or more of the items.

The word "may" is used herein in a permissive sense (i.e., having the potential to, being able to) and not in a mandatory sense (i.e., must).

The terms "comprising" and "including," and forms thereof, are open-ended and mean "including, but not limited to."

When the term "or" is used in this disclosure with respect to a list of options, it will generally be understood to be used in the inclusive sense unless the context provides otherwise. Thus, a recitation of "x or y" is equivalent to "x or y, or both," and thus covers 1) x but not y, 2) y but not x, and 3) both x and y. On the other hand, a phrase such as "either x or y, but not both" makes clear that "or" is being used in the exclusive sense.

A recitation of "w, x, y, or z, or any combination thereof" or "at least one of . . . w, x, y, and z" is intended to cover all possibilities involving a single element up to the total number of elements in the set. For example, given the set [w, x, y, z], these phrasings cover any single element of the set (e.g., w but not x, y, or z), any two elements (e.g., w and x, but not y or z), any three elements (e.g., w, x, and y, but not z), and all four elements. The phrase "at least one of . . . w, x, y, and z" thus refers to at least one element of the set [w, x, y, z], thereby covering all possible combinations in this list of elements. This phrase is not to be interpreted to require that there is at least one instance of w, at least one instance of x, at least one instance of y, and at least one instance of z.

Various "labels" may precede nouns or noun phrases in this disclosure. Unless context provides otherwise, different labels used for a feature (e.g., "first circuit," "second circuit," "particular circuit," "given circuit," etc.) refer to different instances of the feature. Additionally, the labels "first," "second," and "third" when applied to a feature do not imply any type of ordering (e.g., spatial, temporal, logical, etc.), unless stated otherwise.

The phrase "based on" or is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

The phrases "in response to" and "responsive to" describe one or more factors that trigger an effect. This phrase does not foreclose the possibility that additional factors may affect or otherwise trigger the effect, either jointly with the specified factors or independent from the specified factors. That is, an effect may be solely in response to those factors, or may be in response to the specified factors as well as other, unspecified factors. Consider the phrase "perform A in response to B." This phrase specifies that B is a factor that triggers the performance of A, or that triggers a particular result for A. This phrase does not foreclose that performing A may also be in response to some other factor, such as C. This phrase also does not foreclose that performing A may be jointly in response to B and C. This phrase is also intended to cover an embodiment in which A is performed solely in response to B. As used herein, the phrase "responsive to" is synonymous with the phrase "responsive at least in part to." Similarly, the phrase "in response to" is synonymous with the phrase "at least in part in response to."

Within this disclosure, different entities (which may variously be referred to as "units," "circuits," other components, etc.) may be described or claimed as "configured" to perform one or more tasks or operations. This formulation— [entity] configured to [perform one or more tasks]—is used herein to refer to structure (i.e., something physical). More specifically, this formulation is used to indicate that this structure is arranged to perform the one or more tasks during operation. A structure can be said to be "configured to" perform some task even if the structure is not currently being operated. Thus, an entity described or recited as being "configured to" perform some task refers to something physical, such as a device, circuit, a system having a processor unit and a memory storing program instructions executable to implement the task, etc. This phrase is not used herein to refer to something intangible.

In some cases, various units/circuits/components may be described herein as performing a set of task or operations. It is understood that those entities are "configured to" perform those tasks/operations, even if not specifically noted.

The ter "configured to" is not intended to mean "configurable to." An unprogrammed FPGA, for example, would not be considered to be "configured to" perform a particular function. This unprogrammed FPGA may be "configurable to" perform that function, however. After appropriate programming, the FPGA may then be said to be "configured to" perform the particular function.

For purposes of United States patent applications based on this disclosure, reciting in a claim that a structure is "configured to" perform one or more tasks is expressly intended not to invoke 35 U.S.C. § 112(f) for that claim element. Should Applicant wish to invoke Section 112(f) during prosecution of a United States patent application based on this disclosure, it will recite claim elements using the "means for" [performing a function] construct.

Different "circuits" may be described in this disclosure. These circuits or "circuitry" constitute hardware that includes various types of circuit elements, such as combinatorial logic, clocked storage devices (e.g., flip-flops, registers, latches, etc.), finite state machines, memory (e.g., random-access memory, embedded dynamic random-access memory), programmable logic arrays, and so on. Circuitry may be custom designed, or taken from standard libraries. In various implementations, circuitry can, as appropriate, include digital components, analog components, or a combination of both. Certain types of circuits may be commonly referred to as "units" (e.g., a decode unit, an arithmetic logic unit (ALU), functional unit, memory management unit (MMU), etc.). Such units also refer to circuits or circuitry.

The disclosed circuits/units/components and other elements illustrated in the drawings and described herein thus include hardware elements such as those described in the preceding paragraph. In many instances, the internal arrangement of hardware elements within a particular circuit may be specified by describing the function of that circuit. For example, a particular "decode unit" may be described as performing the function of "processing an opcode of an instruction and routing that instruction to one or more of a plurality of functional units," which means that the decode unit is "configured to" perform this function. This specification of function is sufficient, to those skilled in the computer arts, to connote a set of possible structures for the circuit.

In various embodiments, as discussed in the preceding paragraph, circuits, units, and other elements defined by the functions or operations that they are configured to implement, The arrangement and such circuits/units/components with respect to each other and the manner in which they interact form a microarchitectural definition of the hardware that is ultimately manufactured in an integrated circuit or programmed into an FPGA to form a physical implementation of the microarchitectural definition. Thus, the microarchitectural definition is recognized by those of skill in the art as structure from which many physical implementations may be derived, all of which fall into the broader structure described by the microarchitectural definition. That is, a skilled artisan presented with the microarchitectural definition supplied in accordance with this disclosure may, without undue experimentation and with the application of ordinary skill, implement the structure by coding the description of the circuits/units/components in a hardware description language (HDL) such as Verilog or VHDL. The HDL description is often expressed in a fashion that may appear to be functional. But to those of skill in the art in this field, this HDL description is the manner that is used transform the structure of a circuit, unit, or component to the next level of implementational detail. Such an HDL description may take the form of behavioral code (which is typically not synthesizable), register transfer language (RTL) code (which, in contrast to behavioral code, is typically synthesizable), or structural code (e.g., a netlist specifying logic gates and their connectivity). The HDL description may subsequently be synthesized against a library of cells designed for a given integrated circuit fabrication technology, and may be modified for timing, power, and other reasons to result in a final design database that is transmitted to a foundry to generate masks and ultimately produce the integrated circuit. Some hardware circuits or portions thereof may also be custom-designed in a schematic editor and captured into the integrated circuit design along with synthesized circuitry. The integrated circuits may include transistors and other circuit elements (e.g. passive elements such as capacitors, resistors, inductors, etc.) and interconnect between the transistors and circuit elements. Some embodiments may implement multiple integrated circuits coupled together to implement the hardware circuits, and/or discrete elements may be used in some embodiments. Alternatively, the HDL design may be synthesized to a programmable logic array such as a field programmable gate array (FPGA) and may be implemented in the FPGA. This decoupling between the design of a group of circuits and the subsequent low-level implementation of these circuits commonly results in the scenario in which the circuit or logic designer never specifies a particular set of structures for the low-level implementation beyond a description of what the circuit is configured to do, as this process is performed at a different stage of the circuit implementation process.

The fact that many different low-level combinations of circuit elements may be used to implement the same specification of a circuit results in a large number of equivalent structures for that circuit. As noted, these low-level circuit implementations may vary according to changes in the fabrication technology, the foundry selected to manufacture the integrated circuit, the library of cells provided for a particular project, etc. In many cases, the choices made by different design tools or methodologies to produce these different implementations may be arbitrary.

Moreover, it is common for a single implementation of a particular functional specification of a circuit to include, for a given embodiment, a large number of devices (e.g., millions of transistors). Accordingly, the sheer volume of this information makes it impractical to provide a full recitation of the low-level structure used to implement a single embodiment, let alone the vast array of equivalent possible implementations. For this reason, the present disclosure describes structure of circuits using the functional shorthand commonly employed in the industry.

Various units, circuits, or other components may be described as "configured to" perform a task or tasks. In such contexts, "configured to" is a broad recitation of structure generally meaning "having circuitry that" performs the task or tasks during operation. As such, the unit/circuit/component can be configured to perform the task even when the unit/circuit/component is not currently on. In general, the circuitry that forms the structure corresponding to "configured to" may include hardware circuits. Similarly, various units/circuits/components may be described as performing a task or tasks, for convenience in the description. Such descriptions should be interpreted as including the phrase "configured to." Reciting a unit/circuit/component that is configured to perform one or more tasks is expressly intended not to invoke 35 U.S.C. § 112(f) for that unit/circuit/component.

DETAILED DESCRIPTION OF EMBODIMENTS

In the following description, numerous specific details are set forth to provide a thorough understanding of the embodiments described in this disclosure. However, one having ordinary skill in the art should recognize that the embodiments might be practiced without these specific details. In some instances, well-known circuits, structures, and techniques have not been shown in detail for ease of illustration and to avoid obscuring the description of the embodiments.

Referring to FIG. 1, a block diagram of one embodiment of a cache controller 100 is shown. As shown, cache controller 100 includes at least a translation lookaside buffer (TLB) 160 for storing virtual-to-physical address mappings and control unit 120. In various embodiments, cache controller 100 receives virtual addresses from processing circuitry in a processor, translates the virtual address 130 to a physical address 180 by accessing the TLB 160, and sends the physical address 180 to a data cache, which is not shown here for ease of illustration. While TLB 160 is shown as a single structure, it should be understood that this is shown for the purposes of simplicity. TLB 160 may actually include multiple separate banks, arrays, and other structures for storing mappings, metadata, and other data associated with the mappings. In one embodiment, TLB 160 supports storing virtual addresses corresponding to multiple page sizes at the same time. In one embodiment, TLB 160 supports five pages sizes such as 16 kilobyte (KB) pages, 64 KB pages, 2 megabyte (MB) pages, 32 MB pages and 512 MB pages. A variety of other numbers of page sizes and other page sizes can be supported in other embodiments.

Virtual address 130 includes a virtual page number 140 and an offset 150. The offset 150 is used to specify a particular byte in a page. The number of bits forming the virtual page number 140 and the number of bits forming the offset 150 depend on the page size. The virtual page number 140 is a virtual address portion used by processing circuitry in a processor when generating memory access requests. When the TLB 160 stores data using a set-associative cache organization, the virtual page number 140 is divided into a tag 142 and an index 144, with the bit-size of tag 142 and index 144 varying according to the page size. Data is stored in the TLB 160 in various manners. In many cases, the stored data is partitioned into cache lines.

Each row in the TLB 160 stores a virtual page number of a virtual address and a corresponding physical page number of a physical address. In addition, a page size is stored when the TLB 160 is used to store multiple different page sizes at the same time. The status field stores various types of metadata such as a valid bit, a replacement state, and so forth.

One or more of the tag 142 and the index 144 of the virtual address 130 are used to search the TLB 160. When a set-associative cache organization is used, comparators 170 compare the tag portions of the virtual page numbers read from a particular set in the TLB 160 specified by the index 144. When a hit occurs, or there is a match between the virtual page number 140 and a virtual page number stored in an entry of the TLB 160, a physical page number is read out of the TLB entry and concatenated with the offset 150 to form the physical address 180. The physical address 180 is used to index into the data cache.

Additionally, the cache controller 100 processes maintenance requests such as invalidating a single entry or multiple entries of the TLB 160. For example, a command, instruction, request or other sends an indication to the cache controller 100 to invalidate one or more entries of the TLB 160. For example, a context switch or other change occurs to cause a portion of a page table stored in system memory to be removed or replaced. As used herein, the term "invalidate" is defined as marking a TLB entry as no longer available for use, thus effectively removing the entry from the structure.

In one embodiment, control unit 120 includes physical circuitry arranged in an appropriate manner to perform the various functions described herein. While control unit 120 itself is implemented by hardware, its operations may variously be controlled by hardware alone, by instructions executed by control unit 120 (e.g., in the form of firmware of software instructions), or by a combination of these. For example, control unit 120 may include one or more of combinatorial logic, finite state machines, or control and status registers along with an interface to retrieve and execute firmware or other software instructions for running particular subroutines when particular values are stored in a subset of the control and status registers.

In one embodiment, control unit 120 maintains sticky bits 122 to track the splintered page status of one or more translation contexts. The splintered page status refers to whether a given translation context has entries in TLB 160 for one or more splintered pages. A splintered page refers to a physical page that is smaller than a virtual page which maps to the physical page. Sticky bits 122 include any number of sticky status bits such as splintered sticky bits, sticky scan bits, and so on. In one embodiment, the splintered sticky bit tracks the splintered page status while sticky scan bits are used when performing rescan procedures to detect splintered sticky bits that represent false positives. As used herein, a "false positive" is a scenario when a splintered sticky bit is set for a given translation context but there are not any entries for splintered pages of the given translation context in TLB 160. More details on sticky bits 122 and false positive scenarios will be provided later on in the disclosure.

Figure 2:
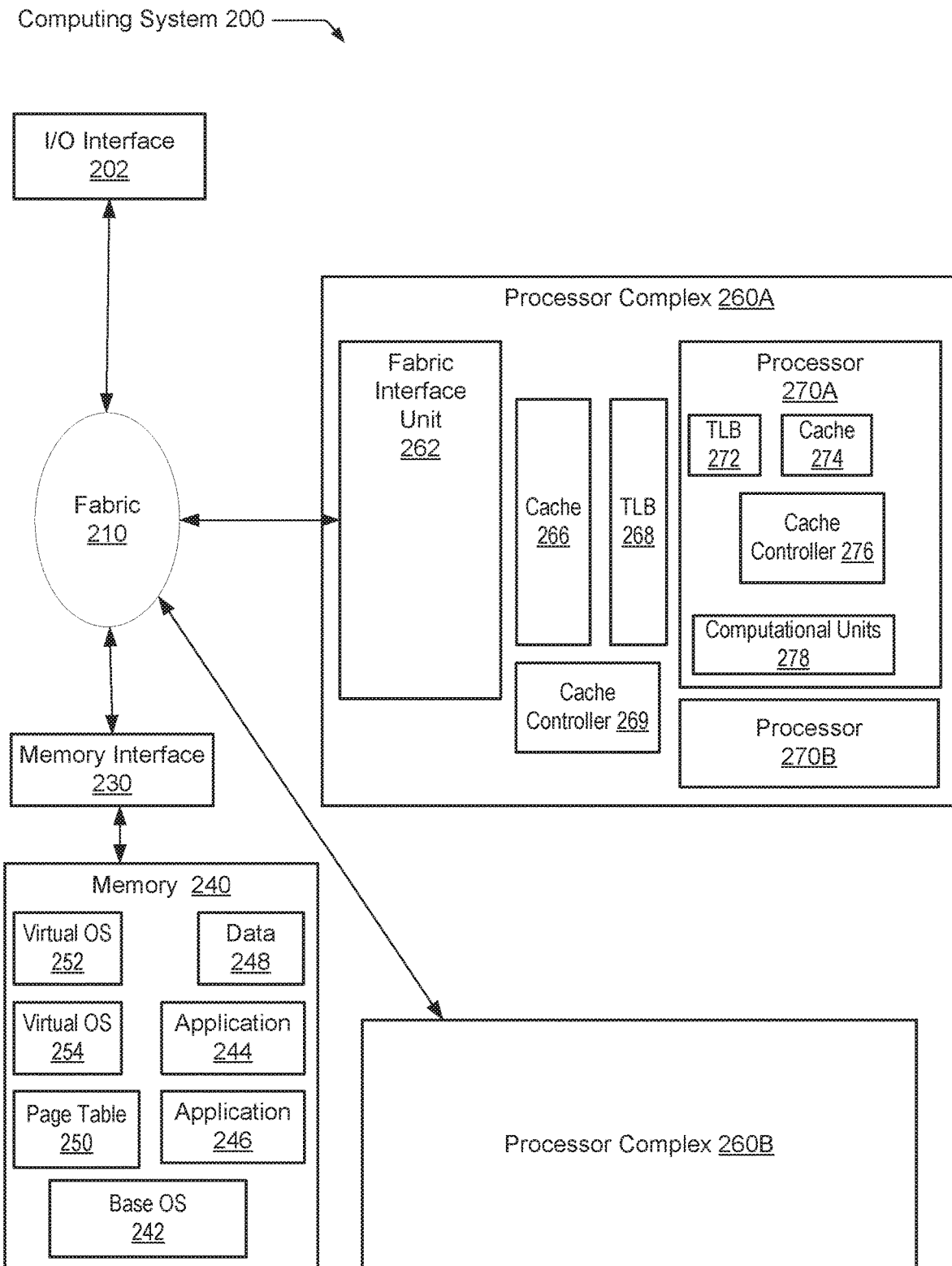
FIG. 2 is a generalized block diagram illustrating one embodiment of a computing system.

Referring to FIG. 2, a generalized block diagram of one embodiment of a computing system 200 is shown. As shown, a communication fabric 210 routes traffic between the input/output (I/O) interface 202, the memory interface 230, and the processor complexes 260A-260B. In various embodiments, the computing system 200 is a system on chip (SoC) that includes multiple types of integrated circuits on a single semiconductor die, each integrated circuit providing a separate functionality. In other embodiments, the multiple functional units are individual dies within a package, such as a multi-chip module (MCM). In yet other embodiments, the multiple functional units are individual dies or chips on a printed circuit board.

Clock sources, such as phase lock loops (PLLs), interrupt controllers, power managers, and so forth are not shown in FIG. 2 for ease of illustration. It is also noted that the number of components of the computing system 200 (and the number of subcomponents for those shown in FIG. 2, such as within each of the processor complexes 260A-260B) vary from embodiment to embodiment. The term "processor complex" is used to denote a configuration of one or more processor cores using local storage, such as a shared cache memory subsystem, and capable of processing a workload together.

In various embodiments, different types of traffic flow independently through the fabric 210. The independent flow is accomplished by allowing a single physical fabric bus to include a number of overlaying virtual channels, or dedicated source and destination buffers, each carrying a different type of traffic. Each channel is independently flow controlled with no dependence between transactions in different channels. The fabric 210 may also be packet-based, and may be hierarchical with bridges, cross bar, point-to-point, or other interconnects.

In some embodiments, the memory interface 230 uses at least one memory controller and at least one cache for the off-chip memory, such as synchronous DRAM (SDRAM). The memory interface 230 stores memory requests in request queues, uses any number of memory ports, and uses circuitry capable of interfacing to memory 240 using one or more of a variety of protocols used to interface with memory channels (not shown). In various embodiments, one or more of the memory interface 230, an interrupt controller (not shown), and the fabric 210 uses control circuitry to ensure coherence among the different processor complexes 260A-260B and peripheral devices.

As shown, memory 240 stores applications 244 and 246. In an example, a copy of at least a portion of application 244 is loaded into an instruction cache in one of the processors 270A-270B when application 244 is selected by the base operating system (OS) 242 for execution. Alternatively, one of the virtual (guest) OS's 252 and 254 selects application 244 for execution. Memory 240 stores a copy of the base OS 242 and copies of portions of base OS 242 are executed by one or more of the processors 270A-270B. Data 248 represents source data for applications in addition to result data and intermediate data generated during the execution of applications.

A virtual address space for the data stored in memory 240 and used by a software process is typically divided into pages of a prefixed size. The virtual pages are mapped to pages of physical memory. The mappings of virtual addresses to physical addresses where virtual pages are loaded in the physical memory are stored in page table 250. Each of translation look-aside buffers (TLBs) 268 and 272 stores a subset of page table 250.

In some embodiments, the components 262-278 of the processor complex 260A are similar to the components in the processor complex 260B. In other embodiments, the components in the processor complex 260A are substantially different from the components in processor complex 260B. As shown, processor complex 260A uses a fabric interface unit (FIU) 262 for providing memory access requests and responses to at least the processors 270A-270B. Processor complex 260A also supports a cache memory subsystem which includes at least cache 266. In some embodiments, the cache 266 is a shared off-die level two (L2) cache for the processors 270A-270B although an L2 cache is also possible and contemplated.

In some embodiments, the processors 270A-270B use a homogeneous architecture. For example, each of the processors 270A-270B is a general-purpose processor, such as a central processing unit (CPU), which utilizes circuitry for executing instructions according to a predefined general-purpose instruction set. Any of a variety of instruction set architectures (ISAs) is selected. In some embodiments, each core within processors 270A-270B supports the out-of-order execution of one or more threads of a software process and include a multi-stage pipeline. The processors 270A-270B may support the execution of a variety of operating systems.

In other embodiments, the processors 270A-270B use a heterogeneous architecture. In such embodiments, one or more of the processors 270A-270B is a highly parallel data architected processor, rather than a CPU. In some embodiments, these other processors of the processors 270A-270B use single instruction multiple data (SIMD) cores. Examples of SIMD cores are graphics processing units (GPUs), digital signal processing (DSP) cores, or otherwise.

In various embodiments, each one of the processors 270A-270B uses one or more cores and one or more levels of a cache memory subsystem. The processors 270A-270B use multiple one or more on-die levels (L1, L2, L3, and so forth) of caches for accessing data and instructions. If a requested block is not found in the on-die caches or in the off-die cache 266, then a read request for the missing block is generated and transmitted to the memory interface 230 via fabric 210. When one of applications 244-246 is selected for execution by processor complex 260A, a copy of the selected application is retrieved from memory 240 and stored in cache 266 of processor complex 260A. In various embodiments, each of processor complexes 260A-260B utilizes virtual addresses when retrieving instructions and data from caches 274 and 266 while processing applications 244-246.

Figure 3:
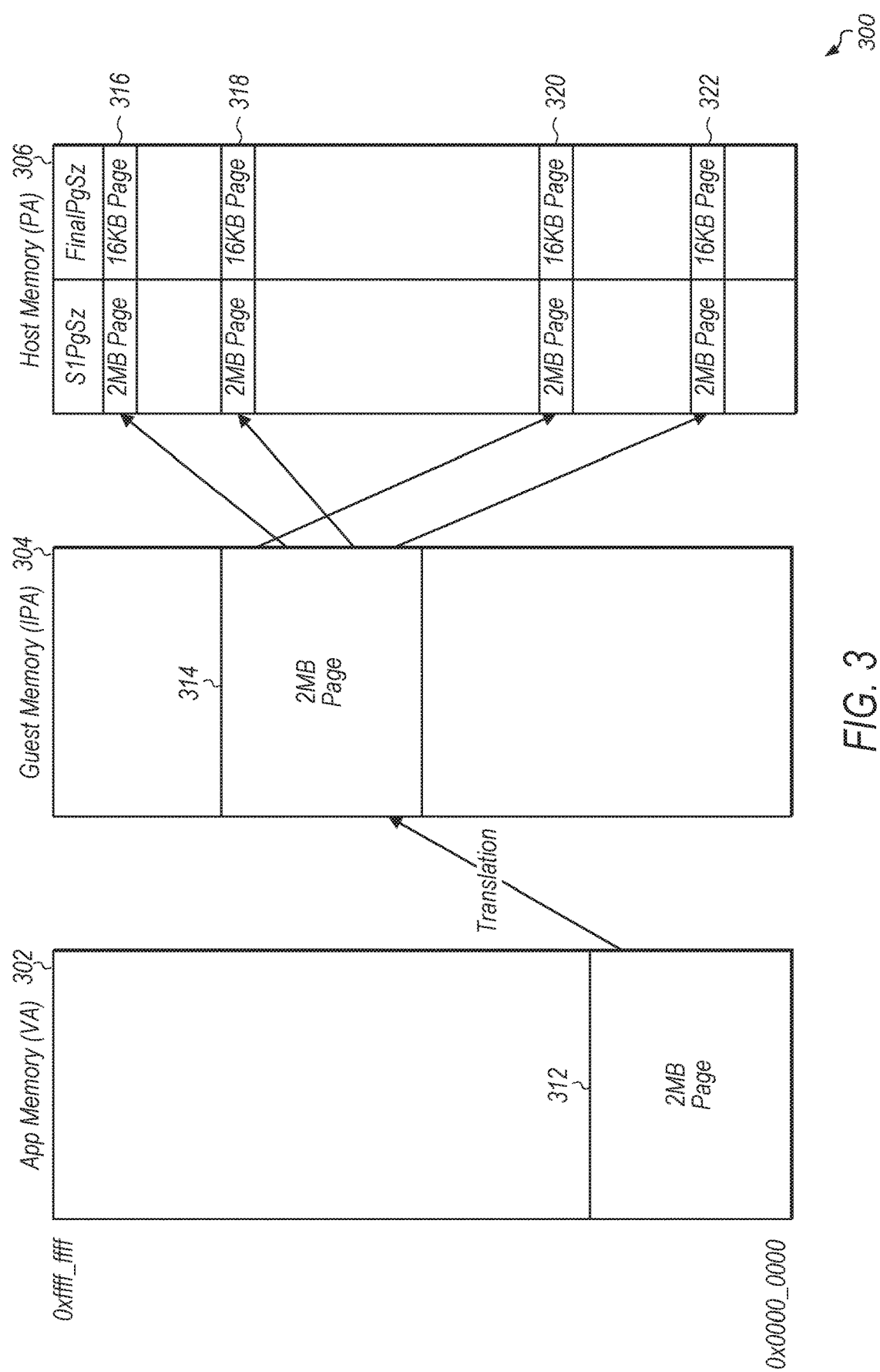
FIG. 3 is a diagram of translations between multiple address spaces in accordance with one embodiment.

Referring now to FIG. 3, a diagram of translations between multiple address spaces in accordance with one embodiment is shown. As shown in FIG. 3, addresses in an application memory virtual address (VA) space 302 are translated into addresses in a guest memory intermediate physical address (IPA) space 304. In this embodiment, addresses in the guest memory IPA space 304 are translated into a host memory physical address (PA) space 306. It is noted that in other embodiments, other numbers of translations may be performed between the application memory VA space and the host memory PA space.

In one embodiment, page sizes in the application memory VA space 302 and guest memory IPA space 304 are 2 MB. This is representative of one embodiment, and does not preclude the use of other page sizes for application memory VA space 302 and/or guest memory IPA space 304 in other embodiments. Also, in one embodiment, the page sizes in the host memory PA space 306 are 16 KB. However, other page sizes may also be used in host memory PA space 306.

As shown in FIG. 3, 2 MB page 312 is translated from application memory VA space 302 into 2 MB page 314 in guest memory IPA space 304. At this point, there is no page splintering since the page size did not change during the translation. However, as can be seen in the subsequent layer of translation, 2 MB page 314 is splintered into multiple 16 KB pages 316, 318, 320, and 322. It is noted that the four 16 KB pages 316, 318, 320, and 322 originating from virtual addresses in 2 MB page 312 are shown to illustrate how a single virtual page can be splintered into multiple smaller physical pages. Any number of entries may be stored in the TLB for a single virtual page, with these entries corresponding to smaller physical pages which are mapped to non-contiguous physical addresses.

When an entry is allocated in the TLB for one of the four 16 KB pages 316, 318, 320, and 322, the TLB will set a splintered sticky bit for the corresponding translation context. In one embodiment, the translation context corresponds to whether the entry is for a guest or host. For example, in this embodiment, the host refers to a hypervisor and the guest refers to a guest operating system (OS) running in a virtual machine environment. In another embodiment, the translation context may be based on some other identifying characteristic, such as an exception level, a portion or the entirety of an address space identifier (ASID), a portion or the entirety of virtual machine ID (VMID), a range of the virtual address (e.g., a single virtual address bit), or otherwise. In a further embodiment, the translation context is determined based on a combination of host/guest ID, VMID, ASID, and/or other information. In other embodiments, the translation context refers to other types of groups or associations.

In one embodiment, if at some point in time an invalidation request targeting 2 MB page 312 is received by a TLB, the TLB will determine which type of invalidation flow to follow depending on the splintered sticky bit status of the translation context corresponding to 2 MB page 312. In one embodiment, the TLB maintains a splintered sticky bit for the translation context corresponding to 2 MB page 312. Since 2 MB page 312 has been splintered into multiple smaller pieces, the splintered sticky bit for 2 MB page 312 will be set (i.e., equal to 1). In the case when the splintered sticky bit is set and an invalidation request targeting 2 MB page 312 is received, the TLB will perform an index walk through all indices searching for entries to invalidate. This index walk is costly in terms of time and power, and techniques for avoiding the index walk when possible are desired. In the case when the splintered sticky bit is not set, then the TLB will invalidate a single entry and avoid performing the index walk.

In some scenarios, a splintered sticky bit for a given translation context can indicate a false positive, meaning the splintered sticky bit is set for the given translation context but there are no entries of splintered pages in the TLB for the given translation context. This can occur because all of the splintered entries (i.e., entries for splintered pages) for a given translation context can be invalidated, or evicted due to capacity limitations, gradually—individually or in groups—until there are no remaining splintered entries for the given translation context. Meanwhile, the precise tracking of the splintered page population may be cost-prohibitive and thus prevent this situation from being detected.

If an invalidation request is received by the TLB for a virtual address associated with a given translation context that has a false positive splintered sticky bit, the TLB will see that the splintered sticky bit is set, and the TLB will perform an index walk to find entries to invalidate. In this case, the index walk is an unnecessary waste of time and power. Accordingly, techniques for discovering false positive splintered sticky bits so as to prevent unnecessary index walks will be described later on in the disclosure.

Figure 4:
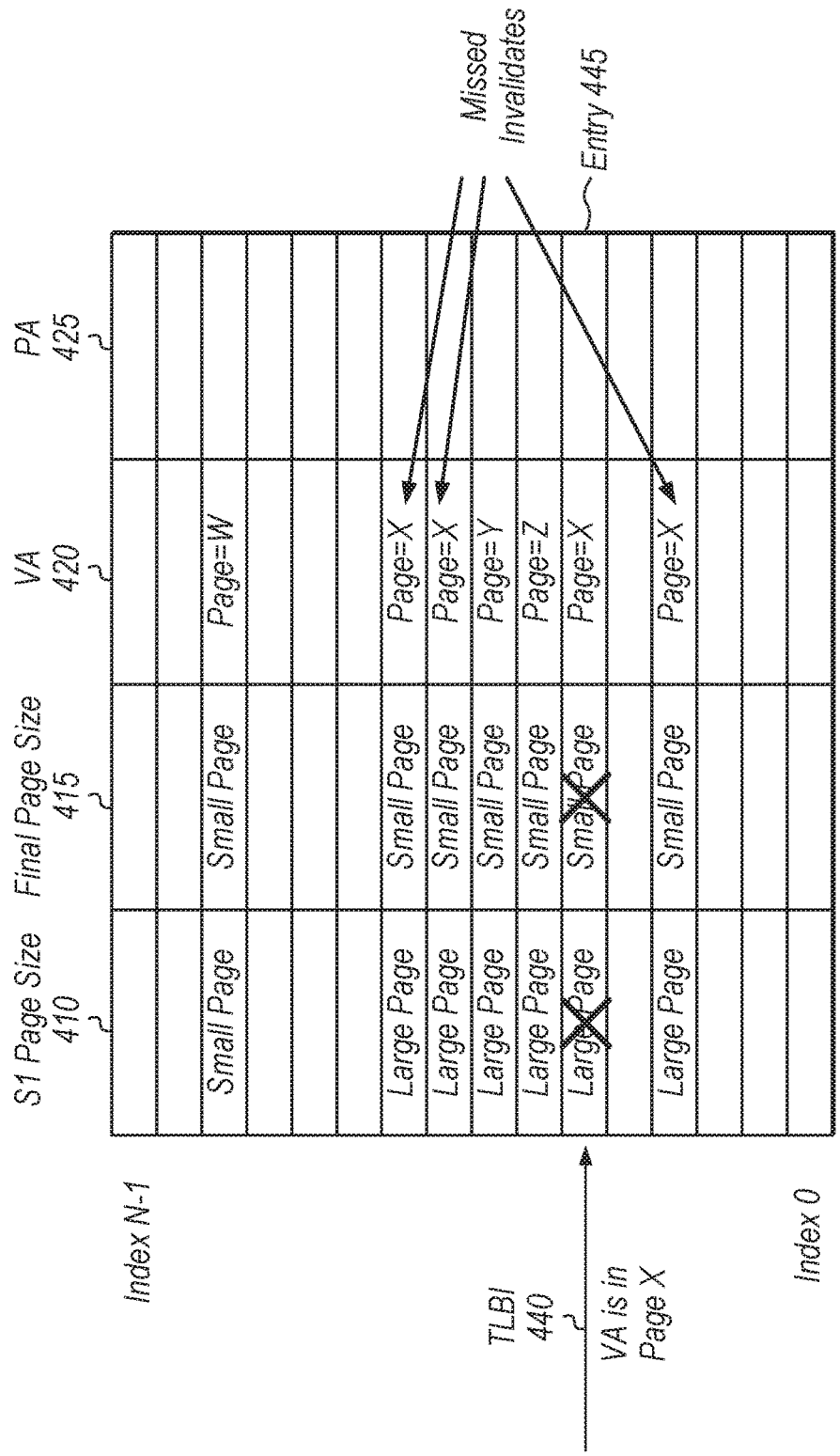
FIG. 4 is a generalized block diagram of one embodiment of entries of a TLB storing splintered pages.

Turning now to FIG. 4, a block diagram of one embodiment of entries of a TLB 400 storing splintered pages is shown. In one embodiment, TLB 400 includes a plurality of entries that are organized with each entry including a plurality of fields specifying different attributes for the corresponding mapping. TLB 400 includes N entries, with N a positive integer, and with the value of N varying from embodiment to embodiment. Each entry in TLB 400 includes multiple fields including stage one (S1) page size field 410, final page size field 415, virtual address (VA) field 420, and physical address (PA) 425. It is noted that entries in TLB 400 may include other fields which are not shown in FIG. 4 to avoid cluttering the figure. TLB 400 may store entries for different sizes of pages, with two separate sizes "Large Page" and "Small Page" depicted in the TLB entries. The size of a "Large Page" may be any size which varies according to the embodiment, with the stipulation that the "Large Page" is larger than the "Small Page". Other embodiments may have three or more different page sizes.

When a TLB invalidate (TLBI) request is received by TLB 400, TLB 400 does not know the page size corresponding to the TLBI request. Nor does TLB 400 know if there are entries for splintered pages in TLB 400 for the page targeted by the TLBI request. A naive way of processing a TLBI request for a given VA would be to invalidate a single entry in TLB 400. This is shown in FIG. 4 for TLBI request 440, which is assumed for the purposes of this discussion to be targeting a VA in page X. When the single entry 445 is invalidated, this misses three other entries in TLB 400 for page X. Accordingly, this would result in three entries remaining in TLB 400 that should have been invalidated. Accordingly, improved techniques for dealing with splintered pages in a TLB are desired to prevent this scenario from occurring. It is noted that the organization of TLB 400 is merely intended to represent one possible embodiment. In other embodiments, the entries of TLB 400 may be structured in other suitable manners with other numbers and/or types of fields different from those shown in FIG. 4.

Figure 5:
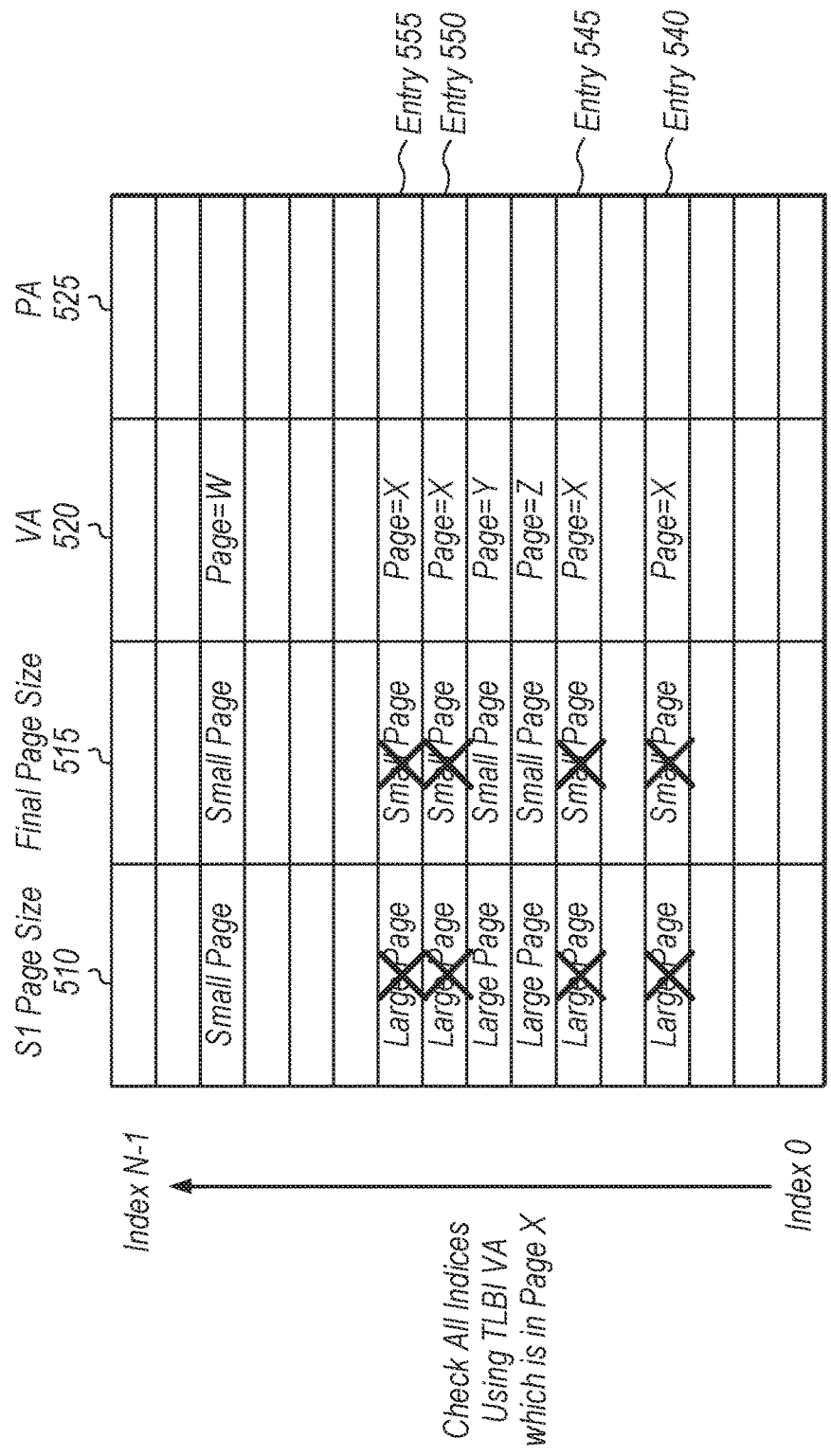
FIG. 5 is a generalized block diagram of one embodiment of entries of a TLB storing splintered pages.

Referring now to FIG. 5, a block diagram of one embodiment of entries of a TLB 500 storing splintered pages is shown. In one embodiment, TLB 500 includes a plurality of entries that are organized with a plurality of fields. It is noted that TLB 500 has the same structure as TLB 400 (of FIG. 4) and the discussion of TLB 500 continues with the previous discussion regarding TLB 400. Since invalidating a single entry in response to a TLBI can result in not catching all of the TLB entries for splintered pages, another approach can be used to walk through all indices of a TLB 500. This is the brute-force approach that is illustrated in FIG. 5.

When walking through all entries in TLB 500 for a TLBI request, each entry corresponding to the original, high-level page will be found and invalidated. It is assumed for the purposes of this discussion that the TLBI request targets a VA in page X. Accordingly, entries 540, 545, 550, and 555 will be invalidated in response to walking through all indices and checking whether the entries correspond to page X. While this brute-force approach catches all splintered pages, it is costly in terms of time and power consumption. Accordingly, more efficient approaches are desired that can determine whether an index walk is required to prevent incurring the expense of walking through all entries in a TLB 500 for every single TLBI that is received.

Figure 6:
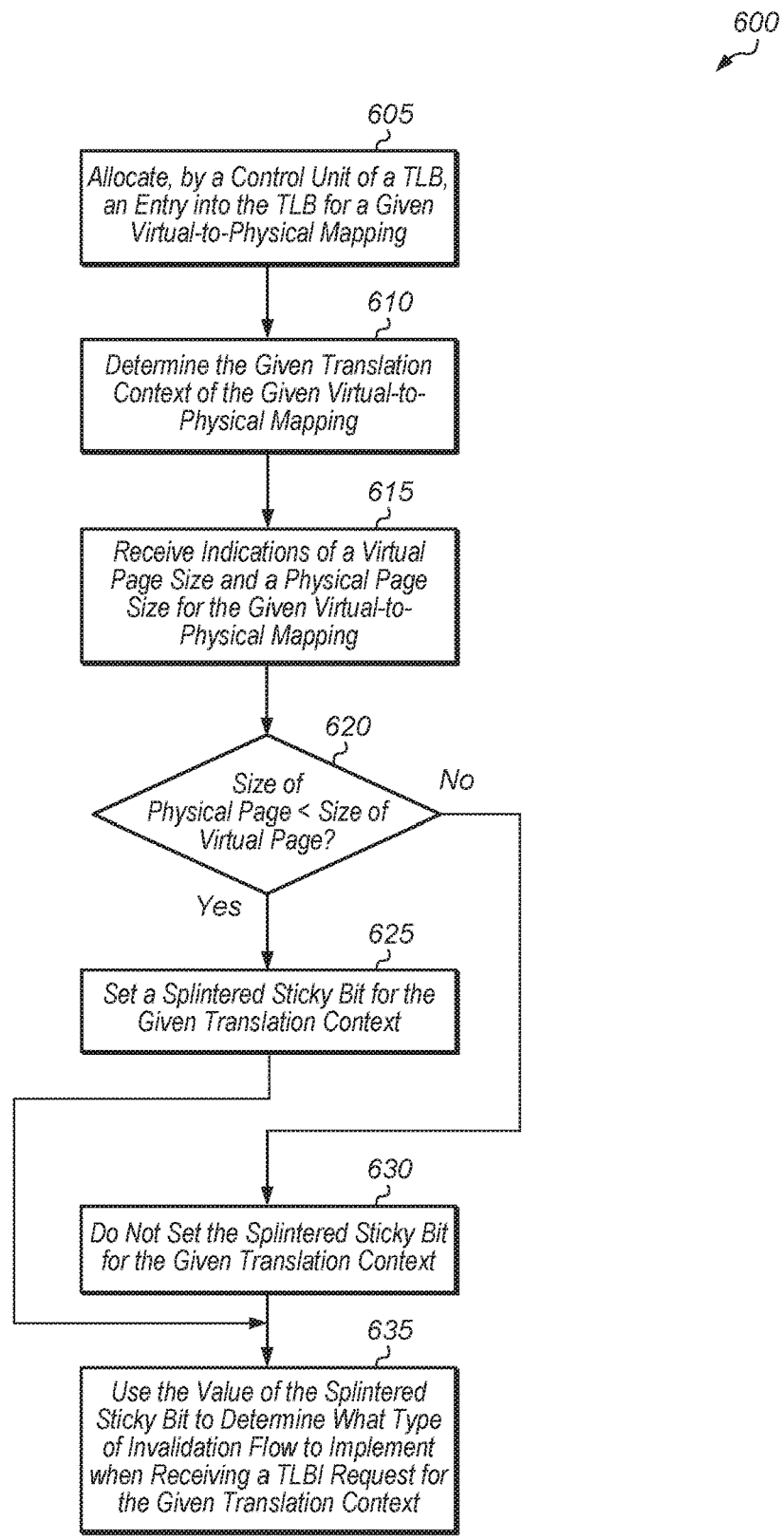
FIG. 6 is a flow diagram of one embodiment of a method for determining an invalidation flow to implement based on the value of a splintered sticky bit.

Turning now to FIG. 6, a generalized flow diagram of one embodiment of a method 600 for determining an invalidation flow to implement based on the value of a splintered sticky bit is shown. For purposes of discussion, the steps in this embodiment (as well as for FIGS. 7-9) are shown in sequential order. However, in other embodiments some steps may occur in a different order than shown, some steps may be performed concurrently, some steps may be combined with other steps, and some steps may be absent.

A control unit (e.g., control unit 120 of FIG. 1) of a TLB allocates a new entry in the TLB for a given virtual-to-physical mapping (block 605). In response to allocate the new entry, the control unit determines the given translation context of the given virtual-to-physical mapping (block 610). The control unit also receives indications of a size of the virtual page and a size of the physical page for the given virtual-to-physical mapping (block 615). If the size of the physical page is less than the size of the virtual page (conditional block 620, "yes" leg), then the control unit sets a splintered sticky bit for the given translation context (block 625). If the size of the physical page is less than the size of the virtual page, then this means the TLB entry is for a splintered page. Therefore, the splintered sticky bit is set for the given translation context to indicate that the given translation context has at least one TLB entry for a splintered page. If the splintered sticky bit was already set for the given translation context, then the splintered sticky bit remains set as a result of block 625.

If the size of the physical page is the same as the size of the virtual page (conditional block 620, "no" leg), then the control unit does not set the splintered sticky bit for the given translation context (block 630). At a later point in time, when the control unit receives a TLBI request for the given translation context, the control unit uses the value of the splintered sticky bit to determine what type of invalidation flow to implement (block 635). After block 635, method 600 ends. One example of implementing block 635 is described below in the discussion of method 700 (of FIG. 7).

Figure 7:
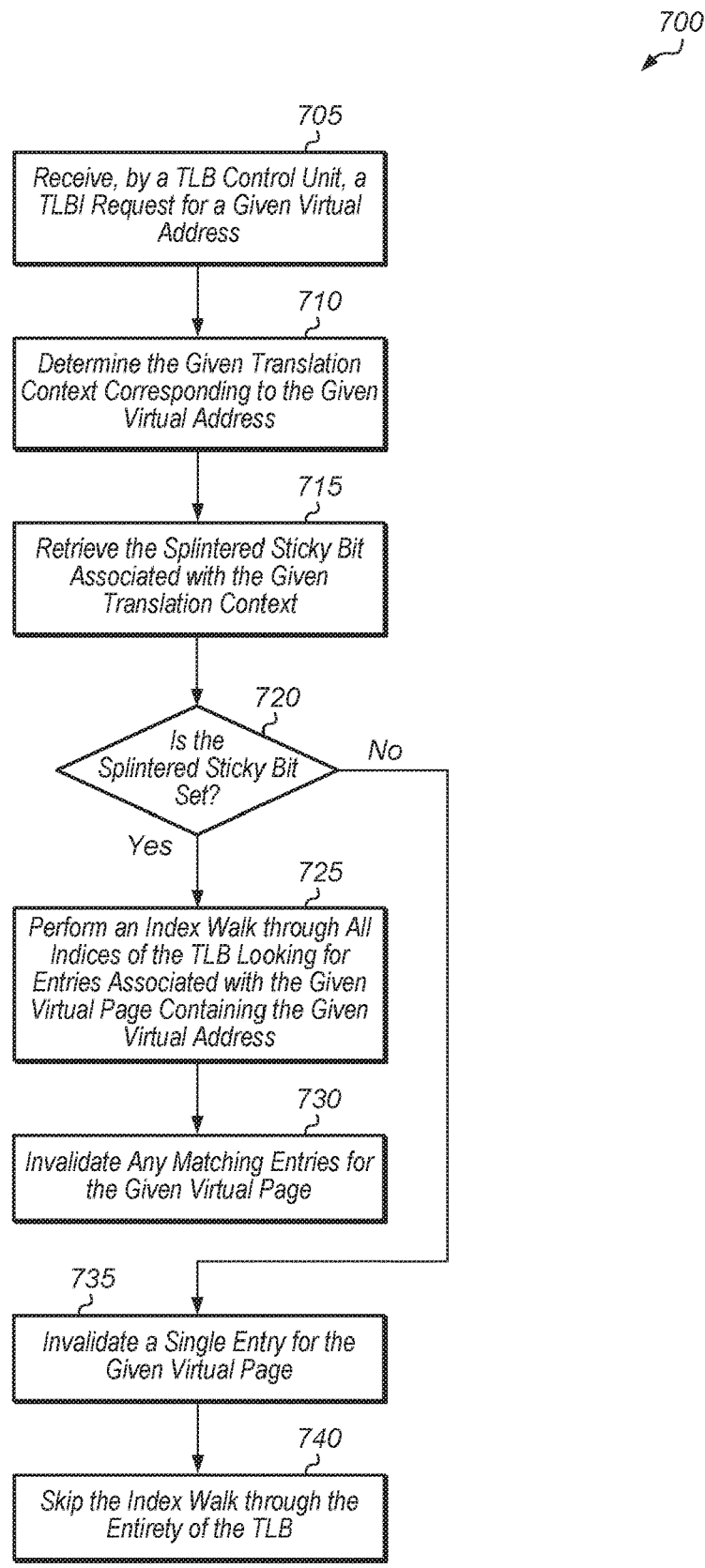
FIG. 7 is a flow diagram of one embodiment of a method for selecting an invalidation flow based on a splintered sticky bit value.

Referring now to FIG. 7, one embodiment of a method 700 for selecting an invalidation flow based on a splintered sticky bit value is shown. A TLB control unit (e.g., control unit 120 of FIG. 1) receive a TLBI request for a given virtual address (block 705). In response to receiving the TLBI request for the given virtual address, the TLB control unit determines the given translation context corresponding to the given virtual address (block 710). Then, the TLB control unit retrieves the splintered sticky bit associated with the given translation context (block 715). If the splintered sticky bit is set (conditional block 720, "yes" leg), then the TLB control unit performs an index walk through all indices of the TLB looking for entries associated with the given virtual page containing the given virtual address (block 725). Next, the TLB control unit invalidates any matching entries for the given virtual page (block 730). After block 730, method 700 ends. In one embodiment, the TLB performs a splintered sticky bit rescan procedure for other translation contexts while performing an index walk through all indices of the TLB for the given translation context. One example of using an index walk through all indices of the TLB to perform a rescan procedure is described in further detail below in the discussion associated with method 800 (of FIG. 8).

Otherwise, if the splintered sticky bit is not set (conditional block 720, "no" leg), then the TLB control unit invalidates a single entry for the given virtual page (block 735). If the TLB supports multiple page sizes, one index is checked per implemented page size. Also, the TLB control unit skips the index walk through the entirety of the TLB (block 740). The TLB control unit can skip the index walk through the entirety of the TLB since the splintered sticky bit is clear, which means that there are no entries for splintered pieces of the given virtual page in the TLB. After block 740, method 700 ends. It should be understood that method 700 can be generalized such that the splintered sticky bit can be set to one of two values, and being set to a first value means at least one splintered piece of a virtual page is present, while being set a second value means there are no splintered pieces present in the TLB. The designations of the first value and the second value may vary according to the embodiment.

Figure 8:
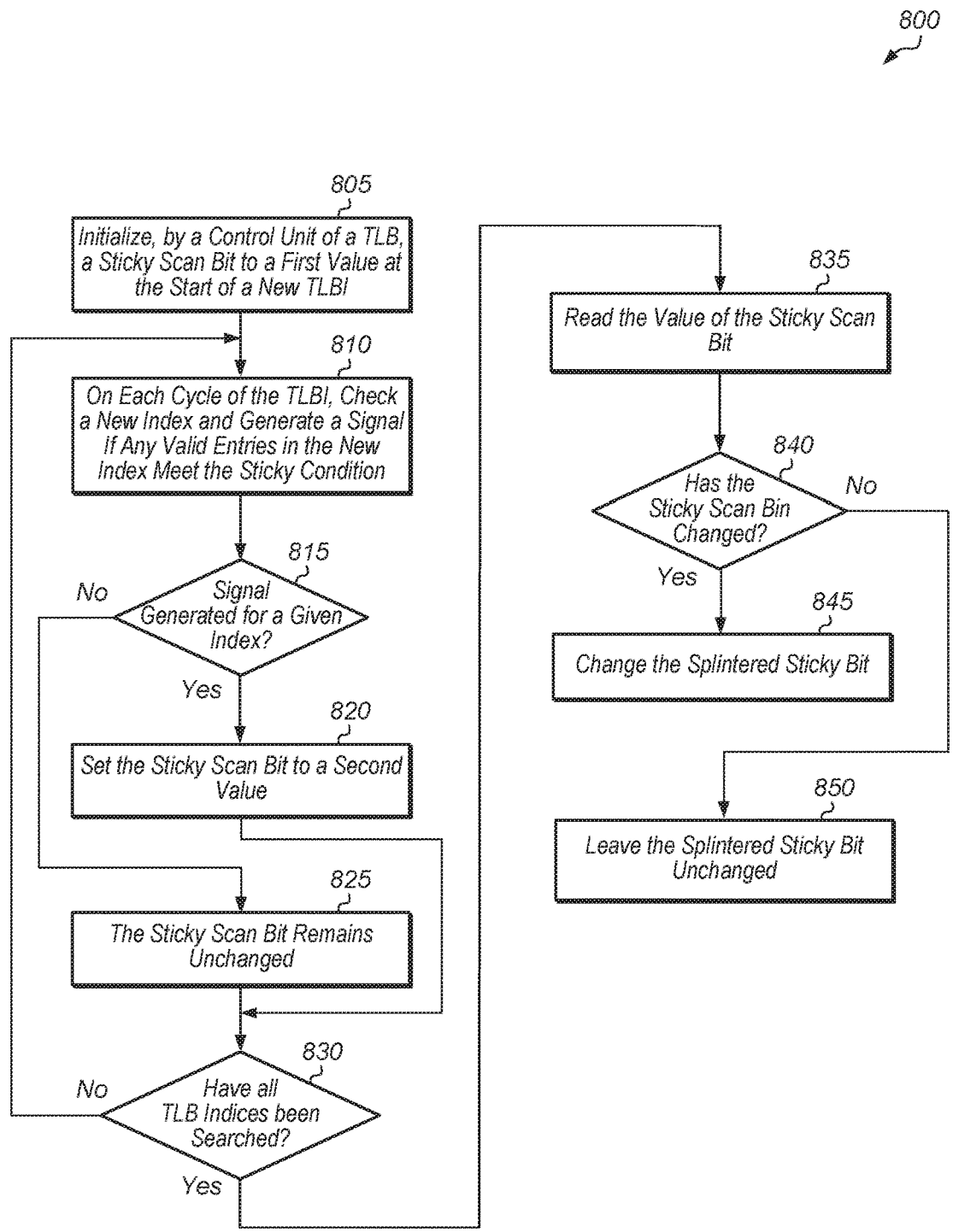
FIG. 8 is a flow diagram of one embodiment of a method for performing a rescan procedure to refresh sticky bits for a TLB invalidate splinter flow.

Turning now to FIG. 8, one embodiment of a method 800 for performing a rescan procedure to refresh sticky bits for a TLB invalidate splinter flow is shown. At the start of a new TLBI index walk, a TLB control unit initializes a sticky scan bit to a first value (e.g., 0) (block 805). On each cycle of the TLBI index walk, a new index is checked (e.g., by incrementing through the indices of the TLB, one per cycle) and a signal is generated if any valid entries in the index being checked meet the sticky condition (block 810). For example, in one embodiment, the "sticky condition" refers to a valid entry which has a smaller physical page size than the virtual page size. If the signal is generated for a given index (conditional block 815, "yes" leg), then the sticky scan bit is set to a second value (e.g., 1) (block 820). It is noted that if the entry being tested is being invalidated by the TLBI that caused the all-index walk, the entry is not considered "valid" and will not cause the sticky scan bit to be set to the second value. Otherwise, if the signal is not generated for a given index (conditional block 815, "no" leg), then the sticky scan bit remains unchanged (block 825).

If all TLB indices have been searched (conditional block 830, "yes" leg), then the value of the sticky scan bit is read (block 835). If the sticky scan bit is unchanged (conditional block 840, "yes" leg), indicating that the sticky condition was not found, then the splintered sticky bit is changed (i.e., inverted) to reflect that the sticky condition no longer exists (block 845). If the sticky scan bit has changed (conditional block 840, "no" leg), indicating that the sticky condition was found, then the splintered sticky bit is left unchanged (block 850). After blocks 845 and 850, method 800 ends. If there are still more TLB indices to search (conditional block 830, "no" leg), then method 800 returns to block 810. It is noted that the rescan procedure may be performed concurrently for multiple different translation contexts in some embodiments. When performing a rescan for multiple different translation contexts, the TLB control unit maintains a separate sticky scan bit for each different translation context so as to track the contexts independently of each other. The TLB can also rescan for other attributes associated with the TLB entries. For example, in one embodiment, the TLB simultaneously scans for splintered entries and for guest entries. Scanning for splintered entries potentially allows refreshing the sticky bit that causes a splintered TLBI flow, while scanning for guest entries potentially allows for refreshing the guest sticky bit that allows dropping TLBI requests that only affect guests.

By implementing method 800, the TLB is able to clear false positive splintered sticky bits. For example, all of the splintered pieces of virtual pages for a given translation context may have already been invalidated, but the splintered sticky bit for the given translation context do not reflect this. In this case, a rescan can detect that the given translation context should have its splintered sticky bit cleared to reflect its actual TLB status. In one embodiment, the rescan flow is performed whenever a TLBI all-index flow is performed. This means that the rescan flow is essentially free in terms of power and time by combining with the compulsory index-walk caused by the TLBI itself.

Referring now to FIG. 9, one implementation of a method 900 for checking the rescan conditions for translation contexts is shown. A TLB control unit (e.g., control unit 120 of FIG. 1) detects a condition for performing an index walk through all indices of the TLB (block 905). In one embodiment, the condition that is detected is receiving a TLBI request for a given virtual address while also determining that the splintered sticky bit associated with the corresponding translation context is set. In other embodiments, other types of conditions may be detected in block 905 for performing the index walk.

In response to detecting the condition for performing the index walk, the TLB control unit retrieves the splintered sticky bits for one or more other translation contexts (block 910). The other translation contexts refer to translation contexts not associated with the TLBI request that triggered the index walk. For each of these other translation contexts, if the splintered sticky bit is set for the translation context (conditional block 915, "yes" leg), then the TLB control unit determines if the translation context meets one or more rescan conditions (conditional block 920). The rescan conditions may vary from embodiment to embodiment. In one embodiment, a first rescan condition is the translation context's splintered sticky bit having been set for greater than a threshold amount of time. A second rescan condition is the translation context not having a rescan procedure performed for more than a threshold amount of time. In other embodiments, other rescan conditions may be used.

If the translation context meets the one or more rescan conditions (conditional block 920, "yes" leg), then the control unit performs a rescan procedure for the translation context while performing the index walk for the first translation context (block 925). Otherwise, if the translation context meets the one or more rescan conditions (conditional block 920, "yes" leg), then the control unit does not perform a rescan procedure for the translation context while performing the index walk for the first translation context (block 930). After blocks 925 and 930, method 900 ends.

Figure 10:
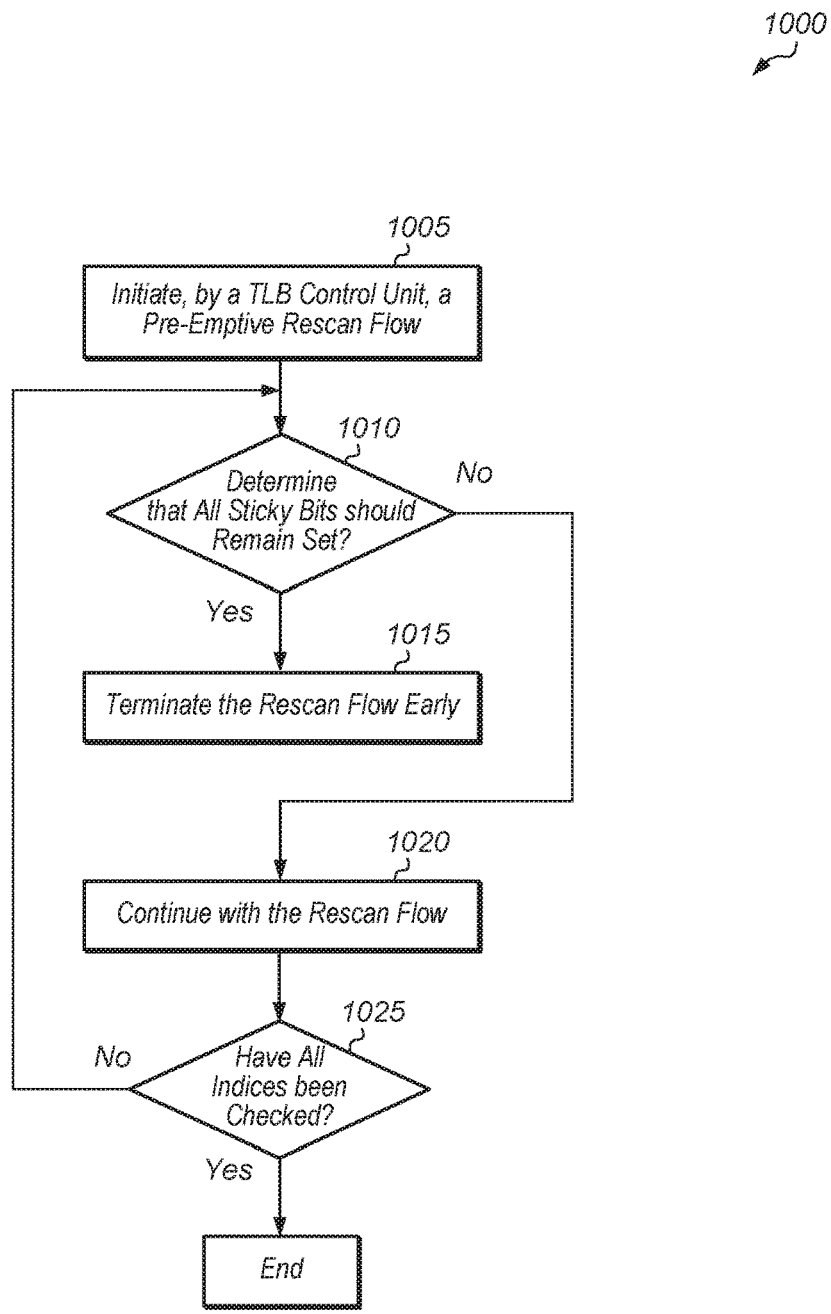
FIG. 10 is a flow diagram of one embodiment of a method for pre-emptively performing a rescan flow.

Turning now to FIG. 10, one embodiment of a method 1000 for pre-emptively performing a rescan flow is shown. A TLB control unit (e.g., control unit 120 of FIG. 1) initiates a pre-emptive rescan flow (block 1005). In one embodiment, the TLB control unit initiates the pre-emptive rescan flow during system idle time. Any of various ways for detecting when the system is idle are possible. In some embodiments, the pre-emptive rescan flow is initiated only if one or more of the splintered sticky bits are set.

Next, during the pre-emptive rescan flow, if it determined that all of the sticky bits should remain set (conditional block 1010, "yes" leg), then the rescan flow terminates early (block 1015). After block 1015, method 1000 ends. In one embodiment, the TLB control unit determines that all of the sticky bits should remain set when all of the sticky bits have been changed based on the detection of valid entries that meet each of the corresponding sticky conditions for flipping each respective sticky bit. For example, if there are three separate sticky scan bits (one for guest pages, one for a first translation context, one for a second translation context), then once all three separate sticky scan bits are flipped, the rescan flow terminates early. It is noted that the rescan flow described in method 800 (of FIG. 8) may also be terminated early if all sticky bits have been flipped. However, the index walk for the TLBI would still continue in method 800 even if the rescan flow is terminated early.

Otherwise, if at least one sticky scan bit has not been changed (conditional block 1010, "no" leg), then the rescan flow continues (block 1020). Continuing with the rescan flow involves stepping through the indices of the TLB and checking for any valid entries that meet the sticky conditions. In one embodiment, a portion of the rescan flow may be terminated early, such that once a given sticky scan bit is flipped, the given sticky condition corresponding to that given sticky scan bit no longer needs to be checked at each index. Accordingly, if a portion of the rescan flow is terminated early, the rescan flow can continue and entries will be checked at each index for only a subset of the sticky scan conditions.

After block 1020, if all indices have been checked (conditional block 1025, "yes" leg), then method 1000 ends. Otherwise, if there are still indices remaining to be checked (conditional block 1025, "no" leg), then method 1000 returns to conditional block 1010. By performing the pre-emptive rescan flow during system idle time, the TLB does not incur the delay of a complete TLB index walk on the critical program execution path in order to clear the sticky bits. In one embodiment, the TLB waits for a programmable time interval to elapse between successive pre-emptive rescan flow attempts.

Figure 11:
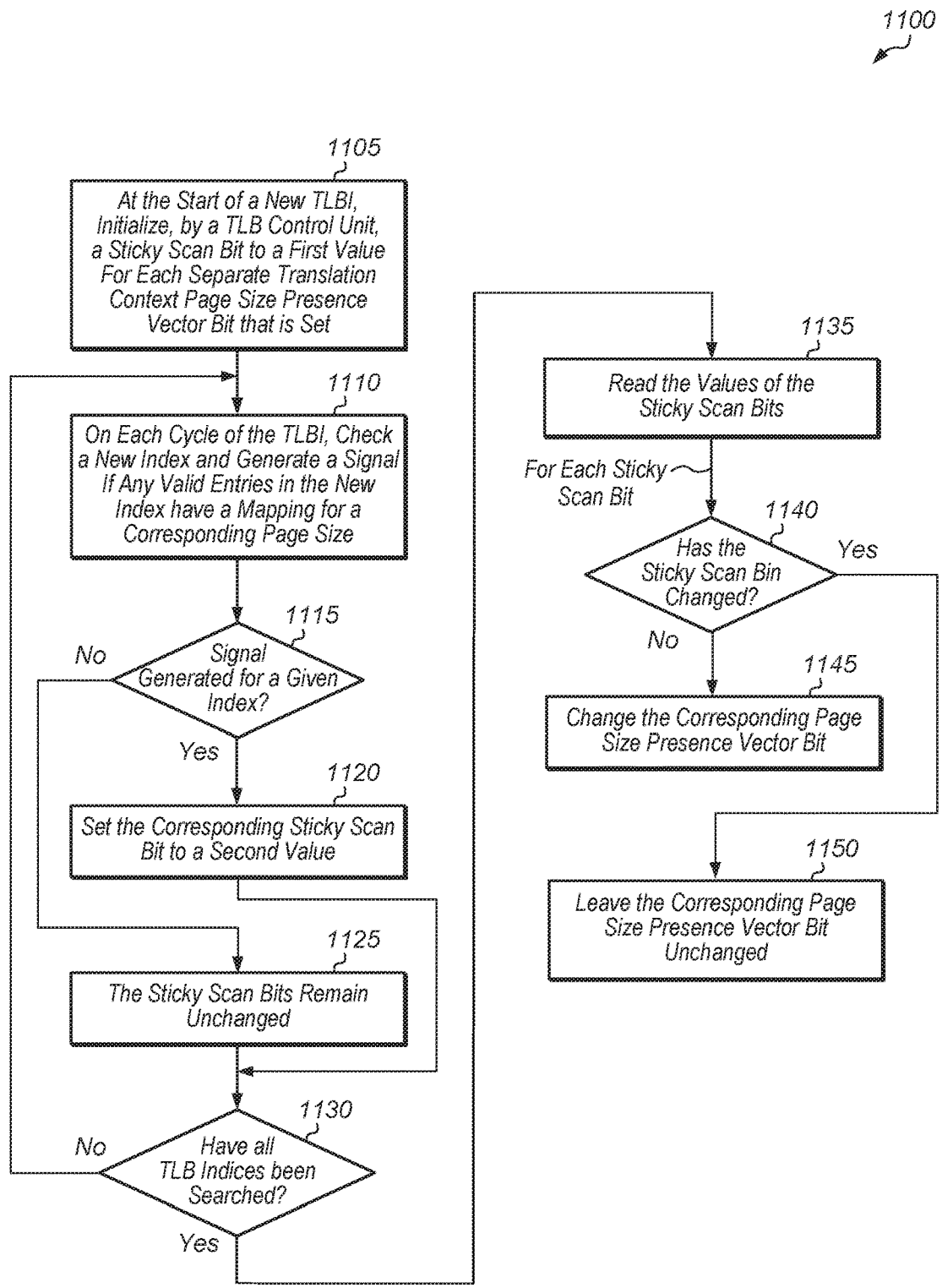
FIG. 11 is a flow diagram of one embodiment of a method for performing a rescan procedure to refresh page size presence vector bits during a TLBI index walk.

Referring now to FIG. 11, one embodiment of a method 1100 for performing a rescan procedure to refresh page size presence vector bits during a TLBI index walk is shown. At the start of a new TLBI index walk, a TLB control unit initializes a sticky scan bit to a first value (e.g., 0) for each separate translation context page size presence vector bit that is set (block 1105). In other words, there is a separate sticky scan bit for each separate translation context page size presence vector bit that is set. All of these separate sticky scan bits are initialized to the first value at the start of the new TLBI index walk. There may be any number of translation contexts, with each translation context having its own page size presence vector. Also, there may be any number of bits per page size presence vector. In one embodiment, the TLB maintains a separate page size presence vector for each different translation context. In this embodiment, each page size presence vector tracks which of the supported page sizes have been used for a corresponding translation context since a most recent reset event. The page size presence vectors help to reduce the number of TLB lookups that are performed for a given translation request. The number of bits in a page size presence vector corresponds to the number of different possible page sizes that could be used for the corresponding translation context. It is possible that a bit may be set in a given page size presence vector even though there are no longer any valid mappings in the TLB for the corresponding page size for that translation context. The rescan procedure helps to detect and clear any of these out-of-date page size presence vector bits.

On each cycle of the TLBI index walk, a new index is checked (e.g., by incrementing through the indices of the TLB, one per cycle) and a signal is generated if any valid entries in the index being checked have a mapping for a corresponding page size (block 1110). If the signal is generated for a given index for a given translation context and page size (conditional block 1115, "yes" leg), then the corresponding sticky scan bit is set to a second value (e.g., 1) (block 1120). Otherwise, if the signal is not generated for a given index (conditional block 1115, "no" leg), then the sticky scan bits remain unchanged (block 1125).

If all TLB indices have been searched (conditional block 1130, "yes" leg), then the values of the sticky scan bits are read (block 1135). For each sticky scan bit, if the sticky scan bit is unchanged (conditional block 1140, "no" leg), indicating that this particular page size was not found, then the corresponding page size presence vector bit is changed (i.e., inverted) to reflect that mappings for this particular page size and for this translation context are no longer stored in the TLB (block 1145). For each sticky scan bit, if the sticky scan bit has changed (conditional block 1140, "yes" leg), indicating that the page size was found, then the corresponding page size presence vector bit is left unchanged (block 1150). After blocks 1145 and 1150, method 1100 ends. If there are still more TLB indices to search (conditional block 1130, "no" leg), then method 1100 returns to block 1110. It is noted that method 1100 may be performed in conjunction with other rescan procedures. For example, when a TLBI index walk is performed, a rescan procedure to refresh page size presence vectors may be performed at the same time one or more rescan procedures for refreshing splintered sticky bits of various translation contexts are performed. Generally speaking, rescan procedures for each type of sticky bit (e.g., guest, splintered) or for page size presence vectors can be performed independently of, or in conjunction with, one another. Whether these rescan procedures are performed independently of each other or together may vary from embodiment to embodiment. It is noted that the sticky bits may also be referred to as a "presence vector". For example, the guest sticky bit may be referred to as a guest presence vector or guest presence bit, and the splintered sticky bit may be referred to as a splintered presence vector or splintered presence bit.

Figure 12:
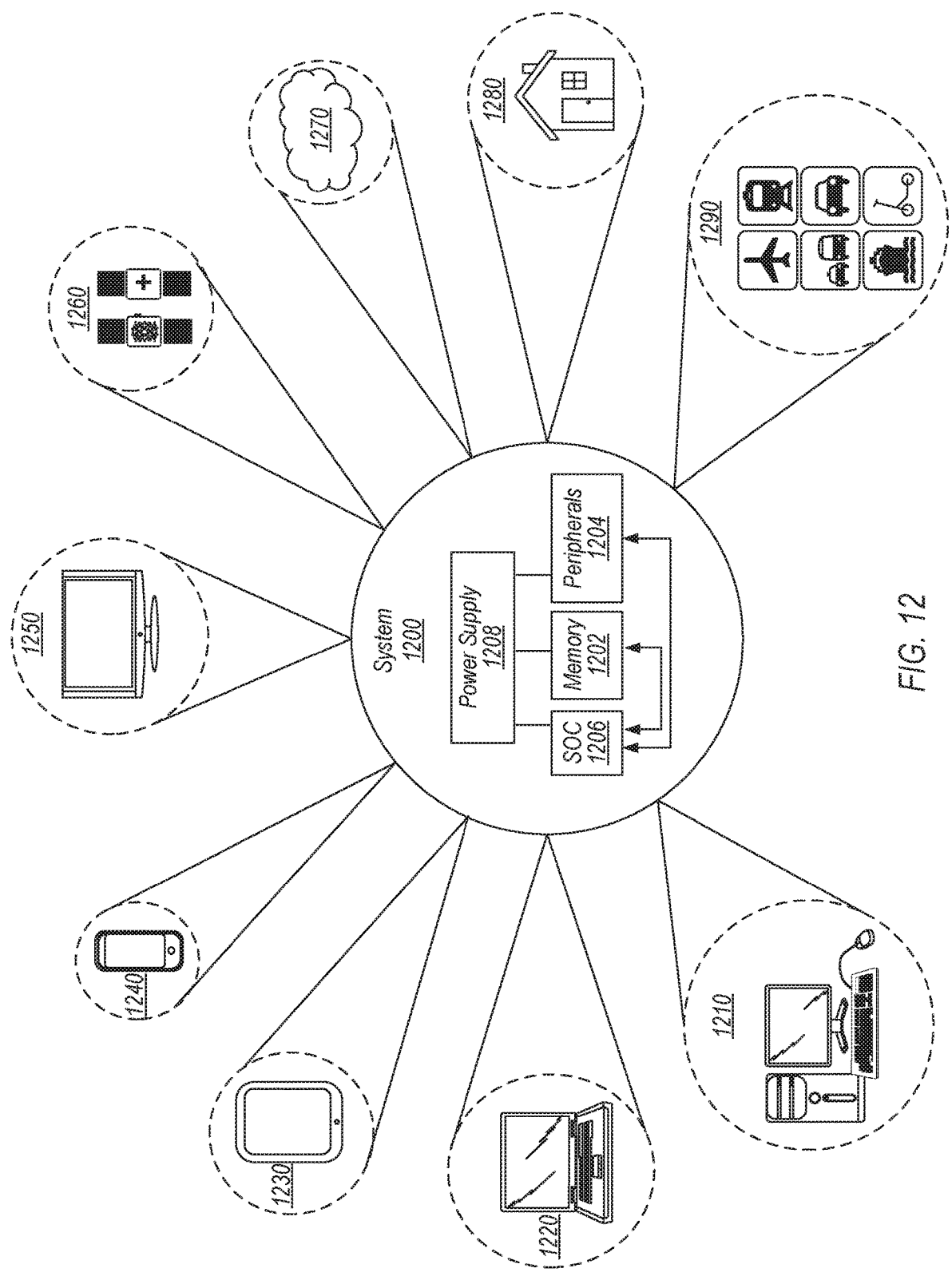
FIG. 12 is a block diagram of one embodiment of a system.

Referring now to FIG. 12, a block diagram of one embodiment of a system 1200 is shown that may incorporate and/or otherwise utilize the methods and mechanisms described herein. In the illustrated embodiment, the system 1200 includes at least one instance of a system on chip (SoC) 1206 which may include multiple types of processing units, such as a central processing unit (CPU), a graphics processing unit (GPU), or otherwise, a communication fabric, and interfaces to memories and input/output devices. In some embodiments, one or more processors in SoC 1206 includes at least one TLB. In some embodiments, SoC 1206 includes components similar to cache controller 100 (of FIG. 1) and computing system 200 (of FIG. 2). In various embodiments, SoC 1206 is coupled to external memory 1202, peripherals 1204, and power supply 1208.

A power supply 1208 is also provided which supplies the supply voltages to SoC 1206 as well as one or more supply voltages to the memory 1202 and/or the peripherals 1204. In various embodiments, power supply 1208 represents a battery (e.g., a rechargeable battery in a smart phone, laptop or tablet computer, or other device). In some embodiments, more than one instance of SoC 1206 is included (and more than one external memory 1202 may be included as well).

The memory 1202 is any type of memory, such as dynamic random access memory (DRAM), synchronous DRAM (SDRAM), double data rate (DDR, DDR2, DDR3, etc.) SDRAM (including mobile versions of the SDRAMs such as mDDR3, etc., and/or low power versions of the SDRAMs such as LPDDR2, etc.), RAMBUS DRAM (RDRAM), static RAM (SRAM), etc. One or more memory devices may be coupled onto a circuit board to form memory modules such as single inline memory modules (SIMMs), dual inline memory modules (DIMMs), etc. Alternatively, the devices are mounted with a SoC or an integrated circuit in a chip-on-chip configuration, a package-on-package configuration, or a multi-chip module configuration.

The peripherals 1204 include any desired circuitry, depending on the type of system 1200. For example, in one embodiment, peripherals 1204 includes devices for various types of wireless communication, such as wifi, Bluetooth, cellular, global positioning system, etc. In some embodiments, the peripherals 1204 also include additional storage, including RAM storage, solid state storage, or disk storage. The peripherals 1204 include user interface devices such as a display screen, including touch display screens or multi-touch display screens, keyboard or other input devices, microphones, speakers, etc.

As illustrated, system 1200 is shown to have application in a wide range of areas. For example, system 1200 may be utilized as part of the chips, circuitry, components, etc., of a desktop computer 1210, laptop computer 1220, tablet computer 1230, cellular or mobile phone 1240, or television 1250 (or set-top box coupled to a television). Also illustrated is a smartwatch and health monitoring device 1260. In some embodiments, smartwatch may include a variety of general-purpose computing related functions. For example, smartwatch may provide access to email, cellphone service, a user calendar, and so on. In various embodiments, a health monitoring device may be a dedicated medical device or otherwise include dedicated health related functionality. For example, a health monitoring device may monitor a user's vital signs, track proximity of a user to other users for the purpose of epidemiological social distancing, contact tracing, provide communication to an emergency service in the event of a health crisis, and so on. In various embodiments, the above-mentioned smartwatch may or may not include some or any health monitoring related functions. Other wearable devices are contemplated as well, such as devices worn around the neck, devices that are implantable in the human body, glasses designed to provide an augmented and/or virtual reality experience, and so on.

System 1200 may further be used as part of a cloud-based service(s) 1270. For example, the previously mentioned devices, and/or other devices, may access computing resources in the cloud (i.e., remotely located hardware and/or software resources). Still further, system 1200 may be utilized in one or more devices of a home 1280 other than those previously mentioned. For example, appliances within the home 1280 may monitor and detect conditions that warrant attention. For example, various devices within the home 1280 (e.g., a refrigerator, a cooling system, etc.) may monitor the status of the device and provide an alert to the homeowner (or, for example, a repair facility) should a particular event be detected. Alternatively, a thermostat may monitor the temperature in the home 1280 and may automate adjustments to a heating/cooling system based on a history of responses to various conditions by the homeowner. Also illustrated in FIG. 12 is the application of system 1200 to various modes of transportation 1290. For example, system 1200 may be used in the control and/or entertainment systems of aircraft, trains, buses, cars for hire, private automobiles, waterborne vessels from private boats to cruise liners, scooters (for rent or owned), and so on. In various cases, system 1200 may be used to provide automated guidance (e.g., self-driving vehicles), general systems control, and otherwise. These and many other embodiments are possible and are contemplated. It is noted that the devices and applications illustrated in FIG. 12 are illustrative only and are not intended to be limiting. Other devices are possible and are contemplated.

In various embodiments, program instructions of a software application may be used to implement the methods and/or mechanisms previously described. The program instructions describe the behavior of hardware in a high-level programming language, such as C. Alternatively, a hardware design language (HDL) may be used, such as Verilog. The program instructions are stored on a non-transitory computer readable storage medium. Numerous types of storage media are available. The storage medium is accessible by a computer during use to provide the program instructions and accompanying data to the computer for program execution. In some embodiments, a synthesis tool reads the program instructions in order to produce a netlist comprising a list of gates from a synthesis library.

It should be emphasized that the above-described embodiments are only non-limiting examples of implementations. Numerous variations and modifications will become apparent to those skilled in the art once the above disclosure is fully appreciated. It is intended that the following claims be interpreted to embrace all such variations and modifications.

What is claimed is:

1. An apparatus comprising:
a translation lookaside buffer (TLB) comprising a plurality of entries; and
a control unit comprising circuitry configured to:
set a first splintered sticky bit to a first value when installing an entry in the TLB for a first translation context based on a determination that the entry is for a virtual address of a virtual page that has been splintered into a smaller physical page;
receive a TLB invalidate (TLBI) request for a given virtual address associated with the first translation context;
perform an index walk through all indices of the TLB for the TLBI request based on a determination that the first splintered sticky bit is set to the first value; and
skip the index walk through the TLB for the TLBI request based on a determination that the first splintered sticky bit is set to a second value different from the first value.

2. The apparatus as recited in claim 1, wherein the control unit is further configured to perform a rescan procedure to search for entries of splintered pages for a second translation context during performance of the index walk for the first translation context based on a determination that a second splintered sticky bit for the second translation context is set to the first value.

3. The apparatus as recited in claim 2, wherein to perform the rescan procedure, the control unit is further configured to:
set a sticky scan bit to the first value at a beginning of the index walk;
set the sticky scan bit to the second value if an index includes an entry for a splintered page for the second translation context; and
at an end of the index walk, clear the second splintered sticky bit for the second translation context based on a determination that the sticky scan bit is equal to the first value.

4. The apparatus as recited in claim 2, wherein the control unit is further configured to perform a rescan procedure to search for entries of splintered pages for the second translation context and one or more other translation contexts during performance of the index walk for the first translation context, wherein the entries of splintered pages correspond to a translation context from among a plurality of translation contexts including the second translation context.

5. The apparatus as recited in claim 1, wherein the control unit is further configured to perform a rescan procedure to search for entries of different page sizes corresponding to page size presence vector bits that are set for a translation context from among one or more translation contexts.

6. The apparatus as recited in claim 1, wherein the control unit is further configured to initialize the first splintered sticky bit to a second value different from the first value.

7. The apparatus as recited in claim 1, wherein the control unit is further configured to set a second sticky bit to a first value when installing a subsequent entry in the TLB based on a determination that the subsequent entry is for a page associated with a second translation context.

8. A method comprising:
setting, by a control unit comprising circuitry in a translation lookaside buffer (TLB), a first splintered sticky bit to a first value when installing an entry in the TLB for a first translation context based on a determination that the entry is for a virtual address of a virtual page that has been splintered into a smaller physical page;
receiving a TLB invalidate (TLBI) request for a given virtual address associated with the first translation context;
setting the first splintered sticky bit to a second value different from the first value based at least in part on detecting a first condition; and
skipping an index walk through the TLB for the TLBI request based on a determination that the first splintered sticky bit is set to the second value.

9. The method as recited in claim 8, further comprising performing a rescan procedure to search for entries of splintered pages for the first translation context during performance of the index walk for a second translation context based on a determination that a second splintered sticky bit for the second translation context is set to the first value.

10. The method as recited in claim 9, wherein to perform the rescan procedure, the method further comprising:
setting a sticky scan bit to the first value at a beginning of the index walk through all indices of the TLB;
setting the sticky scan bit to the second value if an index includes an entry for a splintered page for the first translation context; and
at an end of the index walk, clearing the first splintered sticky bit for the first translation context based on a determination that the sticky scan bit is equal to the first value.

11. The method as recited in claim 10, wherein the first condition is the sticky scan bit being equal to the first value at the end of the index walk.

12. The method as recited in claim 8, further comprising performing a rescan procedure to search for entries of different page sizes corresponding to page size presence vector bits that are set for a translation context from among one or more translation contexts.

13. The method as recited in claim 8, further comprising initializing the first splintered sticky bit to the second value.

14. The method as recited in claim 8, further comprising setting a second sticky bit to a first value when installing a subsequent entry in the TLB based on a determination that the subsequent entry is for a page associated with a second translation context.

15. A system comprising:
a plurality of sticky bits;
a translation lookaside buffer (TLB) comprising a plurality of entries; and
a control unit comprising circuitry configured to:
set a first splintered sticky bit to a first value when installing an entry in the TLB for a first translation context based on a determination that the entry is for a virtual address of a virtual page that has been splintered into a smaller physical page;
receive a TLB invalidate (TLBI) request for a given virtual address associated with the first translation context;
set the first splintered sticky bit to a second value different from the first value based at least in part on detecting a first condition; and
skip an index walk through the TLB for the TLBI request based on a determination that the first splintered sticky bit is set to the second value.

16. The system as recited in claim 15, wherein the control unit is further configured to perform a rescan procedure to search for entries of splintered pages for the first translation context during performance of the index walk for a second translation context based on a determination that a second splintered sticky bit for the second translation context is set to the first value.

17. The system as recited in claim 16, wherein to perform the rescan procedure, the control unit is further configured to:
set a sticky scan bit to the first value at a beginning of the index walk through all indices of the TLB;
set the sticky scan bit to the second value if an index includes an entry for a splintered page for the first translation context; and
at an end of the index walk, clear the first splintered sticky bit for the first translation context based on a determination that the sticky scan bit is equal to the first value.

18. The system as recited in claim 17, wherein the first condition is the sticky scan bit being equal to the first value at the end of the index walk.

19. The system as recited in claim 15, wherein the control unit is further configured to perform a rescan procedure to search for entries of different page sizes corresponding to page size presence vector bits that are set for a translation context from among one or more translation contexts.

20. The system as recited in claim 15, wherein the control unit is configured to initialize the first splintered sticky bit to the second value.

* * * * *